(12) United States Patent
Laabs et al.

(10) Patent No.: US 9,319,328 B2
(45) Date of Patent: Apr. 19, 2016

(54) METHOD AND SYSTEM FOR CONTROLLING DATA PACKET TRANSMISSIONS OVER LOSSY PROTOCOLS

(75) Inventors: Matthias Laabs, Munich (DE); Matthias Hammer, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 122 days.

(21) Appl. No.: 13/991,051

(22) PCT Filed: Dec. 3, 2010

(86) PCT No.: PCT/EP2010/068895
§ 371 (c)(1),
(2), (4) Date: Jul. 18, 2013

(87) PCT Pub. No.: WO2012/072148
PCT Pub. Date: Jun. 7, 2012

(65) Prior Publication Data
US 2013/0286886 A1 Oct. 31, 2013

(51) Int. Cl.
*G01R 31/08* (2006.01)
*H04L 12/825* (2013.01)
*H04L 1/00* (2006.01)

(52) U.S. Cl.
CPC ............ *H04L 47/25* (2013.01); *H04L 1/0002* (2013.01); *H04L 1/0009* (2013.01); *H04L 1/0014* (2013.01); *H04L 1/0015* (2013.01); *Y02B 60/31* (2013.01)

(58) Field of Classification Search
CPC ...... H04L 47/25; H04L 1/0002; H04L 1/0009; H04L 1/0014; H04L 1/0015; Y02B 60/31
See application file for complete search history.

(56) References Cited

U.S. PATENT DOCUMENTS

| | | | | |
|---|---|---|---|---|
| 5,150,401 A | * | 9/1992 | Ashby, III | H04K 1/02 380/28 |
| 7,006,662 B2 | * | 2/2006 | Alattar | G06T 1/0028 382/100 |
| 2002/0165004 A1 | * | 11/2002 | Chen | H04L 1/0051 455/522 |

(Continued)

FOREIGN PATENT DOCUMENTS

| | | |
|---|---|---|
| EP | 1 255 368 A1 | 11/2002 |
| GB | 2 410 152 A | 7/2005 |

OTHER PUBLICATIONS

International Search Report dated Jul. 15, 2011, issued in PCT Application No. PCT/EP2010/068895, filed Dec. 3, 2010.

(Continued)

*Primary Examiner* — Robert Wilson
(74) *Attorney, Agent, or Firm* — Workman Nydegger

(57) ABSTRACT

A method for data packets transmission includes a first group of data packets transmitted with a first bitrate, this first group including a first payload. Quality of transmission of the first group of data packets is checked and, if it is above a first threshold, a second group of data packets is transmitted with a second bitrate higher than the first bitrate. The second group of data packets includes a payload, and additional control data (C1) allowing a receiver to check consistency of the delivered payload.

15 Claims, 5 Drawing Sheets

(56) References Cited

U.S. PATENT DOCUMENTS

| | | |
|---|---|---|
| 2006/0104370 A1 | 5/2006 | Yamanaka et al. |
| 2008/0002790 A1 | 1/2008 | Itoh |
| 2009/0080423 A1* | 3/2009 | Ewing .................. H04L 1/0014 370/389 |
| 2011/0170408 A1* | 7/2011 | Furbeck .................. H04L 47/10 370/230 |
| 2013/0286886 A1* | 10/2013 | Laabs .................. H04L 1/0002 370/252 |

OTHER PUBLICATIONS

Written Opinion dated Jul. 15, 2011, issued in PCT Application No. PCT/EP2010/068895, filed Dec. 3, 2010.

* cited by examiner

METHOD AND SYSTEM FOR CONTROLLING DATA PACKET TRANSMISSIONS OVER LOSSY PROTOCOLS

FIELD OF THE INVENTION

The present invention relates to methods and systems for digital data transmission. In particular the invention relates to methods and systems for controlling the bitrate of data packet transmissions over lossy protocols.

BACKGROUND OF THE INVENTION

It is known that in digital transmission it is possible to transmit data with different bitrate.

As an example, Internet provides users the possibility to watch videos stored on web servers. Since different users can have different type of connections to the network (e.g. wireless connection or cable connection or fibre optic connection), the web servers allow users to select the video quality, i.e. the bitrate, they can support. The higher the bitrate, the higher is the quality of the video, but the higher is the possibility of error transmission.

If data are transmitted with a TCP (Transmission Control Protocol) protocol, in case of error the data are sent again and the user only perceives a delay in the transmission or a not correct streaming.

If data are transmitted with an UDP (User Datagram Protocol) protocol, error transmission can be fatal since the receiver will not be able to reconstruct the correct order of the data stream.

Nowadays selection of the bitrate is accomplished with a traditional trial and error approach, wherein the user tries to setup communication with a first bitrate and then tries increasing or decreasing the bitrate until he finds the best compromise between quality and transmission errors.

OBJECTS AND SUMMARY OF THE INVENTION

It is an object of the present invention to provide a method for transmitting data packets that allows trying to increase the bitrate with a reduced risk to lose data. It is a further object of the present invention to provide a method for transmitting data packets that allows automatic selection of the bitrate.

These and further objects are achieved by means of a system and a method for transmitting data incorporating the features of the annexed claims, which form integral part of the present description.

In one aspect of the invention a first group of data packets is transmitted with a first bitrate. This first group of data packets comprises a first payload. Quality of transmission of said first group of data packets is checked and, if it is above a first threshold, a second group of data packets is transmitted with a second bitrate higher than the first bitrate. The second group of data packets comprises a second payload, and additional control data allowing a receiver to check consistency of the delivered payload.

This method therefore provides for a stage wherein, after having checked that transmission works with a given bitrate, it is possible to try increasing the bitrate by transmitting data with a higher bitrate, whereby bitrate is increased by adding control data (instead of payload) to the group of data packets to be transmitted. In this way if the transmission with higher bitrate should fail, it is possible to recover data of the packet by using the added control data, if transmission with the higher bitrate works, then it is possible to maintain the increased bitrate and increase the information content, in particular the payload of the next group of data packets.

It is therefore clear that this method allows increasing the bitrate without losing packets, which is very important in certain transmission protocol, like UDP protocol.

In one preferred embodiment, selection of the bitrate is accomplished in an automatic and dynamic way by evaluating the transmission quality based on objective data, like the number of transmission errors or other parameters like a packet loss rate that can be calculated by the receiver and preferably provided to the transmitter. In this way, if the channel quality changes in time, the method allows automatic modification of the bitrate.

In one embodiment, the decision to increase the bitrate is taken by comparing the quality of transmission (or a parameter linked to it) with a threshold that depends on the bitrate; in this way it is possible to put stricter conditions on quality as the bitrate increases.

BRIEF DESCRIPTION OF THE DRAWINGS

Further features and advantages of the invention will be more apparent upon reading the detailed description of preferred, non-exclusive embodiments of a method and a system for optimizing the bitrate of data packet transmissions according to the invention, which are described as non-limiting examples with reference to the annexed drawings, in which.

These drawings illustrate different aspects and embodiments of the present invention and, where appropriate, like structures, components, materials and/or elements in different figures are indicated by similar reference numbers.

DETAILED DESCRIPTION OF A PREFERRED EMBODIMENT

Figure 1:
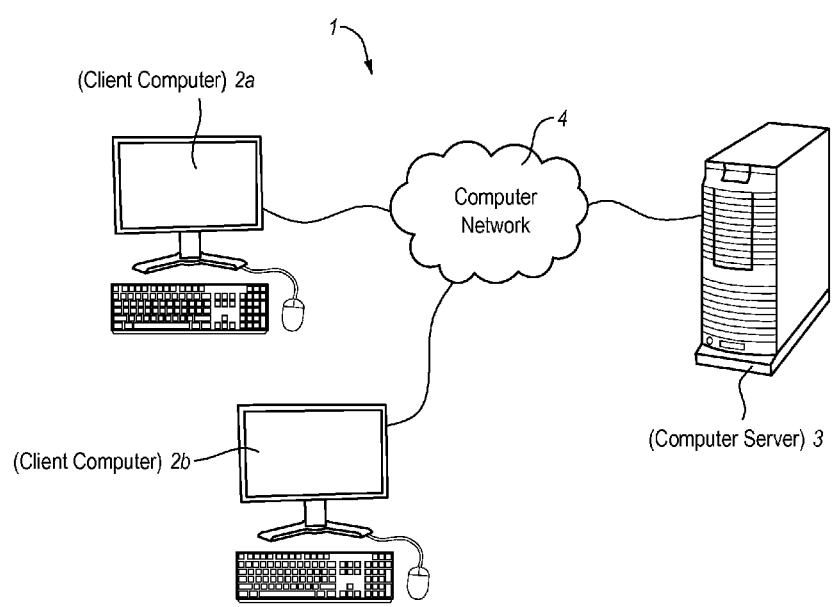
FIG. 1 shows a system wherein a computer server transmits data to a client server.

FIG. 1 shows a communication system 1 comprising a plurality of client computers 2a-2b and a computer server 3 which are connected to a computer network 4. In the preferred embodiment the computer network 4 is the Internet and the computer server 3 is a web server providing services to the client computers 2a and 2b, as an example the web server distributes video (e.g. TV programs, movies, etc. . . . ) on demand.

For the purpose of the present invention, a computer is not to be intended only as a personal computer, rather it has to be understood in a broad sense as a device that can be operated by a user and can process data; as non limiting example a client computer can be a lap top computer, a tablet computer, a palm, a VoIP (Voice over IP) phone, a smart phone, a TV set or a set-top-box with data connection (e.g. an Internet connection).

The type of computer network and the service delivered to the clients are not binding for the invention, which can found application in different networks wherein two computers exchange data; as non limiting example, network 4 can be a computer network, like a LAN (Local Area Networks), WAN (Wide Area Networks), MAN (Metropolitan Area Network) or a telephone network like UMTS (Universal Mobile Telecommunication System) or LTE (Long Term Evolution). Coming back to FIG. 1, the system 1 is adapted to implement a communication method as described with reference to FIG. 2.

Client computer 2a requests (step 201) the computer server 3 (in this case a web server) to transmit a streaming of data (in particular according to the UDP protocol) via the Internet 4. As an example, client computer 2a requests to view a video content stored on the web server 3.

In a preferred embodiment, the request of the client computer 2a comprises information relating to the type of connection and/or to bandwidth requirements of the client connection.

The computer server (step 202) selects a first bitrate for the transmission; this bitrate can be a predetermined bitrate or, preferably, a bitrate selected based on the information on the client connection received with the service request made by the client computer 2a at step 201.

In one embodiment, the data to be transmitted are already compressed with a given compression bitrate, the bitrate at which the packets are transmitted is therefore selected as the maximum between the maximum bitrate supported by the connection and the maximum compression bitrate of the Z packets to be transmitted. In case data have a variable compression bitrate, e.g. in case of multimedia data, the transmission bitrate is selected as the average or the maximum compression bitrate.

Then computer server (step 203) transmits a first group of Z data packets (Z being an integer) to the client computer that has requested the service; transmission is made with a bitrate as defined at the previous method step.

In the preferred embodiment each data packet (indicated with number 301 in FIG. 3) comprises a payload P and control data C which are used by the receiver at least to understand if the payload received is complete and uncorrupted, i.e. if there have been transmission errors.

More in general, the Z data packets comprise a payload and control data which can be integrated in the same data packet or can be transmitted as separate data packets. To the purpose of the present invention, the payload is to be intended as the actual data transmitted from one computer to the other, control data and header information being different from the payload.

The client computer counts (step 204) how many errors have occurred during transmission of this first group of data packets, i.e. it counts how many data packets or how many bits have not been correctly received by the client computer.

Once the Z data packets have been received, the client computer 2a informs computer server 3 of the transmission quality. As an example, client computer 2a generates and sends to computer server 3 an information relating to the number of transmission errors, which information is inversely proportional to transmission quality. Computer server 3 receives this information and then checks (step 205) if the transmission errors are equal or exceed a predetermined threshold E. If errors exceed this threshold, then the method provides for continuing transmission with a lower bitrate, therefore the methods provides for reducing the bitrate (step 206) and goes back to step 203.

If errors are below the threshold c, then the method provides for evaluating (step 207) if it is possible to increase the bitrate; if the bitrate is already the maximum supported by the channel, than the method goes back to step 203 for transmitting another group of Z data packets with the same maximum bitrate, otherwise the method provides for increasing the bitrate to see if the client computer can support a higher bitrate communication.

In one embodiment the threshold $\epsilon$ depends on the bitrate.

Figure 3:
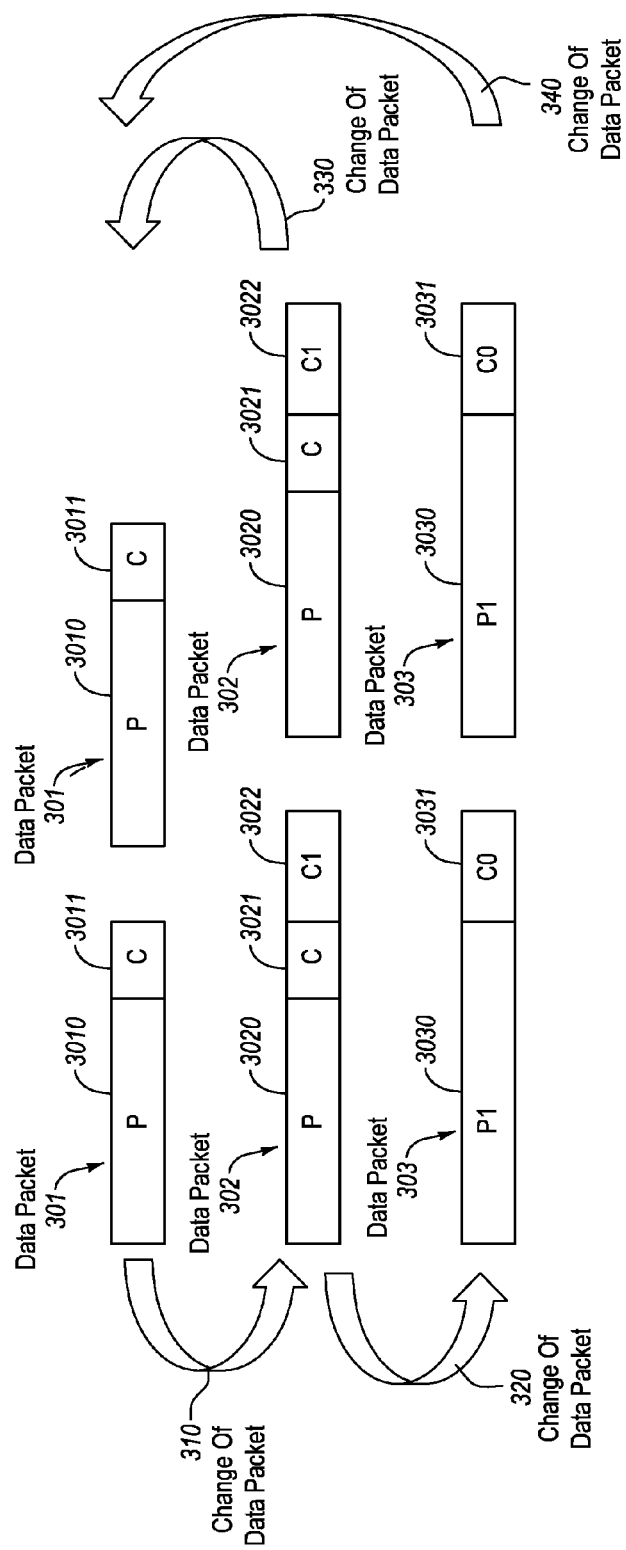
FIG. 3 shows different data packets transmitted in different stages of the method of FIG. 2.

In one embodiment, increasing of the bit rate is accomplished in the way hereby described with the help of FIG. 3.

For each of the next data packets to be transmitted (indicated with number 302 in FIG. 3) the computer server 3 generates (step 208) additional control data C1 to be added to a corresponding data payload P to be transmitted; the new data packet therefore comprises the same amount of information content of the data packets sent before and additional control information C1.

Figure 4:
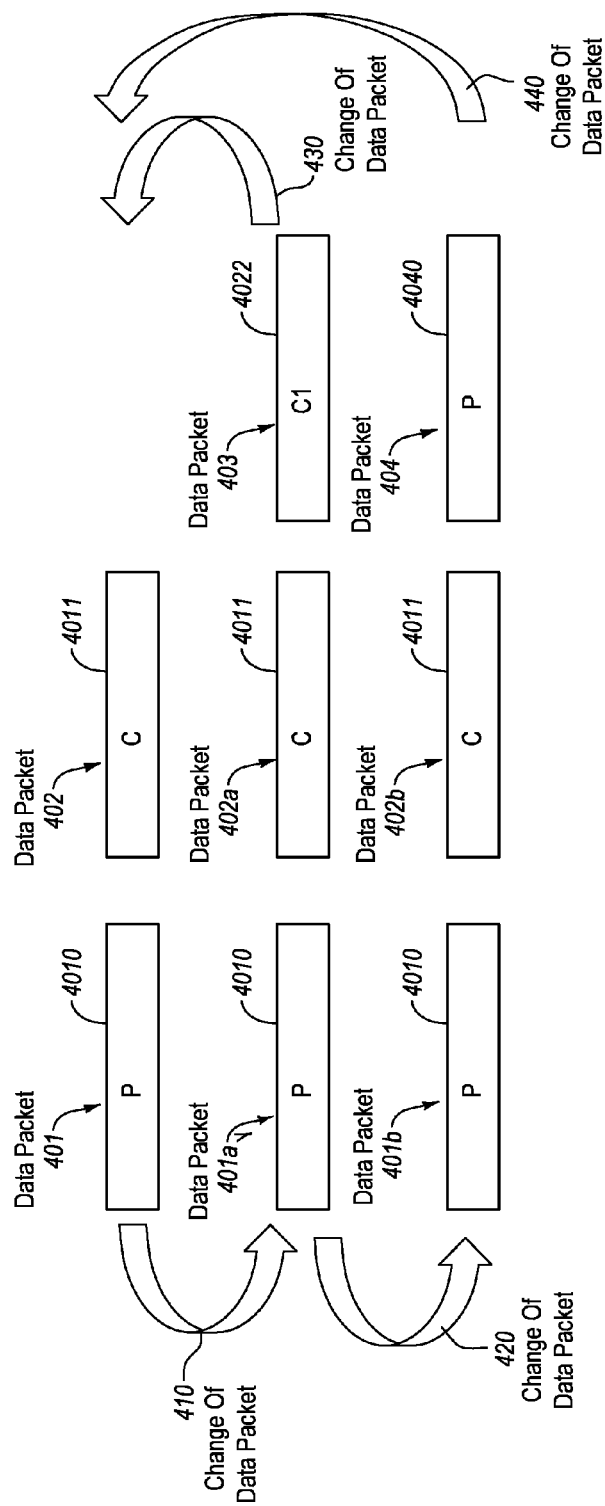
FIG. 4 shows a second embodiment of data packets transmitted in different stages of the method of FIG. 2.

In another embodiment shown in FIG. 4, which does not require modification of the structure of data packets, increasing of the bitrate is obtained by adding control information C1 as additional data packets (403 in FIG. 4).

In both cases, control data C1 are dimensioned so as to obtain the desired bitrate.

In one embodiment, the method provides for transmission with predetermined bitrate values, therefore each time the bitrate is increased or decrease, the next adjacent higher or lower value is selected for transmission.

In another embodiment, the method provides for selecting the bitrate based on feedback received from the client computer; if the quality of transmission at a given bitrate is particularly good, then a bitrate higher than the bitrate next in value is selected; as an example the decision on the bitrate can depend on the number of errors registered by the client computer.

In a further embodiment, the bitrate is calculated each time based on the feedback received from the client computer and relative to transmission quality. In the preferred embodiment, additional control data C1 are generated with a FEC (Forward Error Correction) method, so that they can be used to recover payload data lost due to transmission errors. Other methods for generating the control data can be used, provided they provide for data that can be used by the receiver to find transmission errors and preferably also to recover data errors.

The method then provides for transmitting (step 209) the new group of data packets that, in the embodiment of FIG. 3, is constituted by Z data packets each comprising a payload P, control data C and additional control data C1.

Clearly if the bitrate is increased by adding additional control data as additional packets as described above with reference to FIG. 4, at step 209 the method would then provide for transmitting a new group of Z1 (with Z1>Z) data packets. This new group would therefore transport an overall payload equal to the one transmitted with the first group of Z data packets at step 203, but it would transport additional control packets C1.

The computer server will then wait (step 210) for receiving a feedback from the client computer, which feedback carries the information relating to the number of transmission errors occurred.

Again the computer server checks (step 211) if the errors are more or less than a certain threshold $\epsilon$, i.e. it checks if the quality is higher than a certain threshold. If the errors are less then threshold $\epsilon$, then the method goes back to step 203 and the computer server will transmit a third group of data packets with the increased bitrate, but without the additional control data C1. These data packets therefore will carry more data, i.e. more information content, with respect to packets previously transmitted at step 209. FIG. 3 shows an example of a data packet 303 with increased payload which allows transmitting more data with the increased bitrate. Alternatively an increase of the payload can be obtained by adding payload in place of the additional control data C1 as shown in FIG. 4, wherein the third group of packets comprises an additional data packet 404. In this embodiment, when going back from step 211 to step 203 Z is set to the value Z1, so that at the following step 203 the number of data packets transmitted is equal to the number of data packets transmitted at step 209, i.e. bitrate at step 203 will be the bitrate tested at step 209.

If the errors acknowledged at step 211 are equal to or more than threshold c, then the method goes back to step 206 and the bitrate is decreased.

The method is repeated until all data packets to be transmitted to the client computer 2a have been transmitted, thereby allowing an automatic and dynamic regulation of the bitrate.

FIGS. 3 and 4 allow appreciating the content of different data packets during different steps of the method above described.

In FIG. 3, data packets 301 are data packets transmitted with a first bitrate, e.g. the first packets transmitted by the computer server to the client computer at step 202-203. In the embodiment of FIG. 3, each data packet 301 comprises a payload 3010 with P bits (P being an integer) and control data 3011 with C bits (C being an integer).

Data packets 302 are the data packets transmitted at step 209 after a decision to increase the bitrate due to good reception of the first group of data packet of the type 301. Each data packet 302 comprises a payload 3020 with P bits (P being an integer) and control data 3021 with C bits (C being an integer) and the additional control data 3022 with C1 bits (C1 being an integer) necessary to increase the bitrate. Transmission bitrate of the second group of data packets 302 is therefore increased by changing the format of the packets which now includes more bits per packet.

Data packets 303 are data packets transmitted with the increased bitrate when the method goes from step 211 to 203. Each data packet 303 comprises a payload 3030 with P1 bits (P1 being an integer bigger than P) and control data 3031 with C0 bits (C0 being an integer).

Arrow 310 indicates the change in data packet format when passing from step 203 to 209, i.e. when the method tries communication with the increased bitrate. Arrow 320 indicates the change of the overall payload transported by data packets when passing from step 211 to 203, i.e. when the method, having tested good transmission of packets 302, decides to continue communication with the increased bitrate and therefore increases the payload and deletes the additional control data C1.

Arrow 330 and 340 indicates the change of data packets when the method has failed transmission with a given bitrate and has therefore decided to reduce it. In particular arrow 330 indicates the change of data packets from step 211 to 203 via step 206. Arrow 340 indicates the change of data packets from step 205 to 203 via step 206.

In FIG. 4, packets 401 and 402 are packets transmitted with a first bitrate, e.g. the first packets transmitted by the computer server to the client computer at step 202-203. In the embodiment of FIG. 4, packet 401 is a data packet comprising a payload 4010, whilst packet 402 transports control data 4011. Both packets 401 and 402 have the same format and comprise the same number of M bits (M being an integer).

According to the embodiment of FIG. 4, the increase of bitrate is obtained by increasing the number of data packets instead of changing the format of the data packets as described with reference to FIG. 3. For this reason, the second group of data packets comprises data packets 401a, 402a and 403 that are the data packets transmitted at step 209 after a decision to increase the bitrate due to good reception of the first group of data packet of the type 401 and 402. Data packets 401a and 402a are of the same type of packets 401 and 402 and are therefore not commented. Packet 403 transports additional control data 4022 necessary to increase the bitrate. Data packets 401a, 402a and 403 have all the same format and same number of M bits.

When the method goes from step 211 to 203, in the embodiment of FIG. 4 a third group of data packets 401b, 402b and 404 are transmitted. Packets 401b and 404 are data packets comprising respectively a payload 4010 and a payload 4040, packet 402b transports control data 4011. All packets 401b and 402b and 404 have the same format and comprise the same number of M bits (M being an integer).

Arrow 410 indicates the change of data packets transmitted when passing from step 203 to 209, i.e. when the method tries communication with the increased bitrate.

Arrow 420 indicates the change of data packets transmitted when passing from step 211 to 203, i.e. when the method, having tested good transmission of packets 302, decides to continue communication with the increased bitrate and therefore increases the payload by adding packets 404 and deleting the additional control data C1 (packet 403 of FIG. 4).

Arrow 430 and 440 indicates the change of data packets transmitted when the method has failed transmission with a given bitrate and has therefore to reduce it. In particular arrow 430 indicates the change of data packets from step 211 to 203 via step 206. Arrow 440 indicates the change of data packets from step 205 to 203 via step 206.

The above disclosure shows that the invention fulfils the intended objects and, particularly, overcomes some drawbacks of the prior art.

The system and the method for transmitting data according to the invention are susceptible of a number of changes and variants, which are considered to fall within the inventive concept as defined by the appended claims. All the details can be replaced by other technically equivalent parts without departing from the scope of the present invention.

In one variant, instead of adding systematic FEC data (e.g. data C1) to a given data packet in order to increase the bitrate (step 208 of FIG. 2), it is possible to use a non-systematic scheme for increasing the bitrate while allowing the receiver to check consistency of the delivered packet and eventually recover data. In one example that makes use of a non-systematic scheme, the method provides for encoding a packet comprising payload and control data C into a longer data packet that comprises more bits than the encoded one. In another embodiment it is possible to use non-systematic FEC data to replace the data (payload and control) of data packet 302.

Notwithstanding in the above embodiments the decision for increasing or decreasing the bitrate depends on the number of errors c, other parameters can be considered which represent the transmission quality. In one embodiment the decision on whether to increase or decrease the bitrate (steps 205 and 211 of FIG. 2) depends on a packet loss rate calculated as weighted ratio between number of lost packet and total number of packet delivered, wherein different weights are assigned to higher or lower priority packets. Quality of transmission is measured as the inverse of the packet loss rate. As an example packet loss rate can be calculated as:

$$R = \frac{a \cdot \sum_i Pll_i + b \cdot \sum_i Plh_i}{a \cdot \sum_i Pl_i + b \cdot \sum_i Ph_i}$$

Wherein R is the packet loss rate, Pl are packets with low priority, Ph are packets with high priority, Pll are low priority packets lost, Plh are high priority packets lost, a and b are constants with b>a.

Packet loss rate allows taking into account quality of service since it consider more important the loss of high priority packets than that of low priority packets. In one embodiment, R depends on the bitrate and is preferably selected or calculated in such a way that as the bitrate increase, the lower is R acceptable, so that the higher bitrates contents' perceived quality is better than for the lower bitrate.

Figure 2:
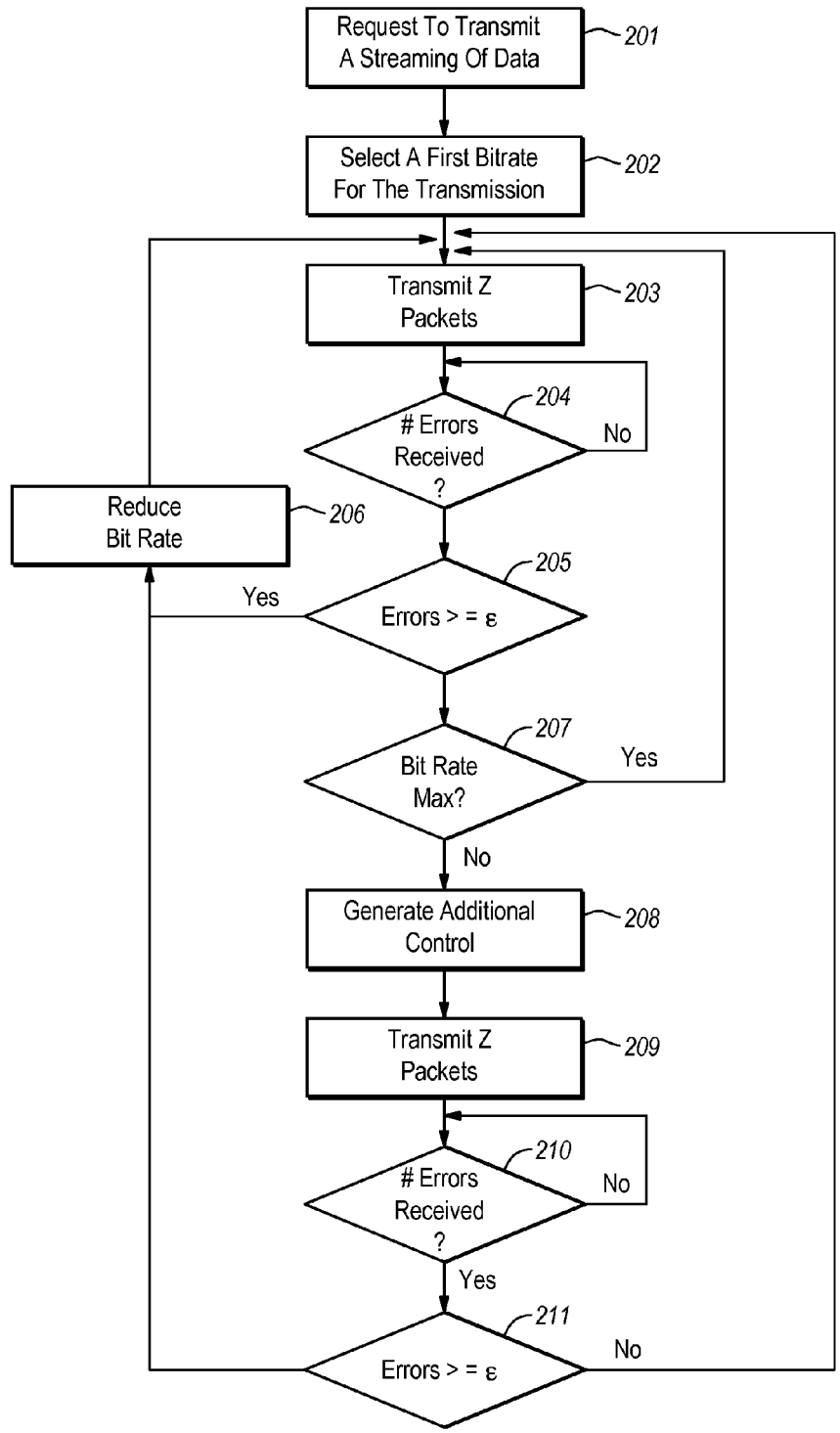
FIG. 2 is a flow diagram of a method for transmitting data implemented by the system of FIG. 1.
Figure 5:
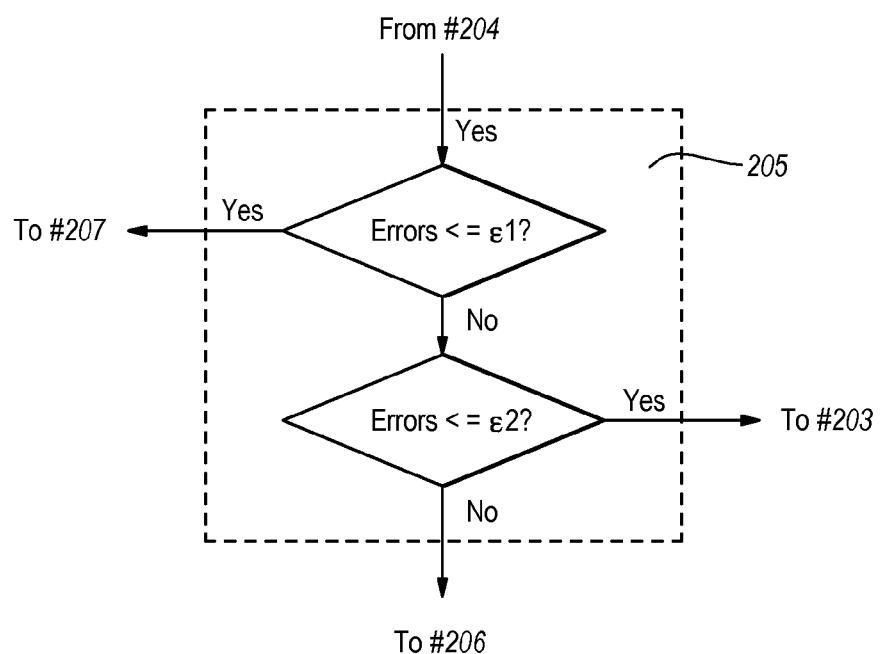
FIG. 5 is a detail of a flow diagram of a second embodiment of a method for transmitting data implementable by the system of FIG. 1.

Moreover, the above described methods provides for deciding to increase or decrease the bitrate by comparing a measured quantity (e.g. n. of errors or packet loss rate) with a single threshold (e.g. $\epsilon$ in the embodiment of FIG. 2). The use of one single threshold is not essential and in a preferred variant, the method provides for the use of two different thresholds, one ($\epsilon 1$) for increasing the bitrate and one ($\epsilon 2$) for decreasing the bitrate. Step 205 of FIG. 2 can then be expanded in a sequence of evaluation steps as disclosed in FIG. 5, wherein it is supposed to measure the number of transmission errors and block 205 is replaced by block 205*. If the number of errors is lower than $\epsilon 1$, then the method goes to step 207 as explained with reference to FIG. 2. If the number of errors is greater than $\epsilon 1$, but lower than $\epsilon 2$, the method provides for transmitting the next group of packets with the same bitrate, therefore the method moves to step 203 of FIG. 2. If the number of errors is greater than $\epsilon 2$, than the method provides for decreasing the bitrate and the method goes to step 206.

This solution provides for a more stable state of the bitrate.

Notwithstanding the above described method shows a fully automatic control of the bitrate, the present invention also applies to mixed control methods wherein the user is involved in the selection of the bitrate.

In one embodiment the method provides for a "continuous" increasing of the bitrate until the client computer determines at which point the quality degrades and informs the server computer to stop the increasing of bitrate. The term "continuous" increasing should be understood as a slow increasing, e.g. bit rate increases between 1 and 10 bit/s (preferably between 1 and 3 bit/s) at each step. This solution could be useful in case the client computer wants to keep resources for other applications to be run.

In another variant of the method above described, the computer client executes all the evaluation for deciding whether to increase or decrease the bitrate as above described for the computer server. In this case, the client computer transmits to the computer server directly the information on the selected bitrate (increased or decreased) and the computer server transmits data packets with the selected bitrate. In one embodiment, the client computer can also inform the computer server if:
- the bitrate is "provisional" and it has to transmit data packets with additional control data C1 for testing the new bitrate, e.g. data packets 302 in the embodiment of FIG. 3, or packets 401a, 402a and 403 in the embodiment of FIG. 4, or
- the bitrate is "already tested" and it has to transmit data packets without the additional control data, e.g. data packets 303 in the embodiment of FIG. 3, or packets 401b, 402b and 404 in the embodiment of FIG. 4.

It is therefore clear that the decisional steps of the method above described with reference to FIG. 2 can be taken by the client computer or by the computer server.

While the system and the method have been described with particular reference to the accompanying figures, the numerals referred to in the disclosure and claims are only used for the sake of a better intelligibility of the invention and shall not be intended to limit the claimed scope in any manner.

The invention claimed is:

1. A method for data packets transmission, comprising the steps of:
   transmitting a first group of data packets with a first bitrate, the data packets of said first group comprising a first payload having a specified number of bits,
   checking a quality of transmission of said first group of data packets,
   if transmission quality of said first group of data packets is above a first threshold, transmitting a second group of data packets with a second bitrate, the data packets in said second group comprising said first payload and additional control data allowing a receiver to check a consistency of the delivered second group of data packets, whereby said second bitrate is higher than said first bitrate,
   checking a quality of transmission of said second group of data packets,
   if the transmission quality of said second group of data packets is above a second threshold, transmitting a third group of data packets with said second bitrate, the data packets in said third group comprising a second payload comprising more bits than said first payload, thereby increasing the bitrate of said second payload.

2. The method according to claim 1, further comprising the steps of:
   checking quality of transmission of said second group of data packets,
   if said transmission quality of said second group of data packets is below a second threshold, transmitting a fourth group of data packets with said first bitrate, said fourth group comprising a payload comprising the same number of bits of said first payload.

3. The method according to claim 1, further comprising the step of transmitting a group of data packets with a third bitrate if transmission quality of said first group of data packets is below a third threshold, said third bitrate being lower than said first bitrate.

4. The method according to claim 3, further comprising the step of transmitting a group of data packets with said first bitrate if transmission quality of said first group of data packets is comprised between said first and said third threshold.

5. The method according to claim 1, wherein said first payload and said second payload have the same number of bits.

6. The method according to claim 1, wherein said additional control data are generated according to a FEC scheme.

7. The method according to claim 1, wherein said additional control data are used for coding a respective payload of a packet of said second group of data packets, whereby the receiver can check consistency of the delivered payload by decoding received packets.

8. The method according to claim 1, wherein said first bitrate depends on information generated by the receiver before starting of transmission.

9. The method according to claim 1, wherein said first group of data packets comprises data packets coded with a different compression bitrate, and wherein said first bitrate is the average or the maximum of the compression bitrates of said first group of data packets.

10. The method according to claim 1, wherein quality of transmission is measured as the inverse of the number of transmission errors ($\epsilon$).

11. The method according to claim 1, wherein data packets are classified based on a priority scheme and wherein a quality of transmission is measured as the inverse of a packet loss rate defined as $$R = \frac{a \cdot \sum_i Pll_i + b \cdot \sum_i Plh_i}{a \cdot \sum_i Pl_i + b \cdot \sum_i Ph_i}$$

wherein R is the packet loss rate, Pl are packets with low priority, Ph are packets with high priority, Pll are low priority packets lost, Plh are high priority packets lost, a and b are constants with b>a.

12. The method according to claim 1, wherein said first threshold depends on the bitrate at which data packets are transmitted.

13. The method according to claim 1, wherein the receiver can generate a command to stop increasing the bitrate, and wherein said second group of data packets are transmitted if transmission quality of said first group of data packets is above said first threshold and if the receiver has not provided a command to stop increasing bit rate.

14. A transmitter for transmitting data packets to a receiver, the transmitter comprising:
   a transmitter unit for transmitting a first group of data packets with a first bitrate, the data packets of said first group comprising a first payload having a specified number of bits, and
   a receiver unit for receiving information about a quality of transmission of said first group of data packets,
   wherein the transmitter unit is configured to generate and transmit a second group of data packets with a second bit-rate if a transmission quality of said first group of data packets is above a first threshold, the data packets in said second group comprising said first payload and additional control data allowing a receiver to check a consistency of the delivered second group of data packets, whereby said second bit-rate is higher than said first bitrate;
   wherein the receiver unit is configured to receive information about a quality of transmission of said second group of data packets, and
   wherein the transmitter unit is configured to transmit a third group of data packets with said second bitrate, if the transmission quality of said second group of data packets is above a second threshold, the data packets in said third group comprising a second payload comprising more bits than said first payload, thereby increasing the bitrate of said second payload.

15. A receiver for receiving data packets from a transmitter, the receiver comprising:
   a receiver unit for receiving a first group of data packets with a first bitrate, the data packets of said first group comprising a first payload having a specified number of bits, and
   a transmitter unit for transmitting information about a quality of transmission of said first group of data packets,
   wherein the receiver unit is configured to receive a second group of data packets with a second bit-rate if the transmission quality of said first group of data packets is above a first threshold, the data packets in said second group comprising said first payload and additional control data allowing the receiver to check a consistency of the delivered second group of data packets, whereby said second bit-rate is higher than said first bitrate;
   wherein the transmitter unit is configured to transmit information about a quality of transmission of said second group of data packets, and
   wherein the receiver unit is configured to receive a third group of data packets with said second bitrate, if the transmission quality of said second group of data packets is above a second threshold, the data packets in said third group comprising a second payload comprising more bits than said first payload, thereby increasing the bitrate of said second payload.

* * * * *